United States Patent
Sodagar (10) Patent No.: US 11,403,106 B2
(45) Date of Patent: Aug. 2, 2022

(54) METHOD AND APPARATUS FOR STATELESS PARALLEL PROCESSING OF TASKS AND WORKFLOWS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/028,125

(22) Filed: Sep. 22, 2020

(65) Prior Publication Data
US 2021/0096924 A1    Apr. 1, 2021

Related U.S. Application Data
(60) Provisional application No. 62/907,628, filed on Sep. 28, 2019.

(51) Int. Cl.
G06F 9/38    (2018.01)
G06F 9/50    (2006.01)

(52) U.S. Cl.
CPC .......... G06F 9/3851 (2013.01); G06F 9/3802 (2013.01); G06F 9/3885 (2013.01); G06F 9/5038 (2013.01); G06F 9/5061 (2013.01)

(58) Field of Classification Search
CPC .............................. G06F 9/3851; G06F 9/5038
See application file for complete search history.

(56) References Cited

U.S. PATENT DOCUMENTS

| | | | |
|---|---|---|---|
| 8,804,751 B1 | 8/2014 | Poole et al. | |
| 10,031,775 B2* | 7/2018 | Modani | G06F 9/4881 |
| 2004/0247122 A1 | 9/2004 | Hobrock et al. | |
| 2005/0120140 A1* | 6/2005 | Bodlaender | H04L 69/163 |
| | | | 709/249 |
| 2006/0146185 A1 | 7/2006 | Chen | |
| 2015/0143444 A1* | 5/2015 | Dong | H04N 21/44016 |
| | | | 725/116 |
| 2021/0099403 A1 | 4/2021 | Sodagar | |

OTHER PUBLICATIONS

International Search Report and Written Opinion dated Dec. 30, 2020 in PCT/US 20/52236.
"Text of ISO/IEC DIS 23090-8 Network-based Media Processing", Systems Subgroup, ISO/IEC JTC1/SC29/WG11 N18657, Jul. 12, 2019, pp. 1-156, ISO copyright Office, Published in Switzerland.

* cited by examiner

*Primary Examiner* — William B Partridge
(74) *Attorney, Agent, or Firm* — Arentfox Schiff LLP (57) ABSTRACT

A method for parallel processing of a data stream is provided. In the method, a processing task is received. The processing task is configured to process a data stream that includes a plurality of segments. A split operation is subsequently performed on the data stream to split the plurality of segments into N sub-streams, where each of the N sub-streams includes one or more segments of the plurality of segments, and the N is a positive integer. Further, N sub-processing tasks are performed on the N sub-streams to generate N processed sub-streams. A merge operation is performed on the N processed sub-streams to generate a merged output data stream. The merged output data stream is identical to an output data steam that is generated when the processing task is applied directly to the data stream without the split operation.

20 Claims, 7 Drawing Sheets

METHOD AND APPARATUS FOR STATELESS PARALLEL PROCESSING OF TASKS AND WORKFLOWS

INCORPORATION BY REFERENCE

This present disclosure claims the benefit of priority to U.S. Provisional Application No. 62/907,628, "STATELESS PARALLEL PROCESSING OF TASKS AND WORKFLOWS IN CLOUD COMPUTING" filed on Sep. 28, 2019, which is incorporated by reference herein in its entirety.

TECHNICAL FIELD

The present disclosure describes embodiments generally related to data processing including parallel processing of tasks or workflows to increase data processing speed.

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Workflows can be used in data processing to process data, such as media data, in a data processing system. In some examples, a workflow includes a large number of processing tasks. When a large number of tasks are run by a data processing system, such as a cloud platform, to process data, processing speed can be reduced. Increasing the speed of processing requires increasing performance speed of the underlying platform of the data processing system. However, increasing the performance speed of the underlying platform is not always possible or can be very costly.

SUMMARY

Aspects of the disclosure provide methods and apparatuses for parallel processing of a data stream, such as a media stream. In the method, a processing task can be received. The processing task can be configured to process a data stream that includes a plurality of segments. A split operation can be subsequently performed on the data stream to split the plurality of segments into N sub-streams, where each of the N sub-streams can include one or more segments of the plurality of segments. The N can be a positive integer. Further, N sub-processing tasks can be performed on the N sub-streams to generate N processed sub-streams. A merge operation can be performed on the N processed sub-streams to generate a merged output data stream. The merged output data stream can be identical to an output data steam that is generated when the processing task is applied directly to the data stream without the split operation.

In the method, each of the N sub-processing tasks can perform a same process as the processing task.

In order to perform the split operation, the data stream can be transmitted to a split buffer that is configured to split the data stream into the N sub-streams. The split buffer can include an input indexed first in first out (iFIFO) buffer and N sub-input iFIFO buffers that are coupled to the input iFIFO buffer. The input iFIFO buffer can be configured to receive the data stream and index information of the segments of the data stream, and distribute the segments of the data stream to the N sub-input iFIFO buffers. In addition, each of the N sub-input iFIFO buffers can receive the respective one or more segments from the input iFIFO buffer and output a corresponding sub-stream to a different one of the N sub-processing tasks, where the corresponding sub-stream can include the respective one or more segments.

In some embodiments, the data stream can be split according to boundaries of the segments in the splitting operation.

In some embodiments, the index information of each of the segments of the data stream can include a respective start time, a respective duration, and a respective length.

In some embodiments, the respective duration of each of the segments of the data stream can be equal to one or a multiple of a process segment duration of the processing task. The process segment duration of the processing task can be one of a number of frames and a number of seconds.

In the method, the processing task can include one of an encoding process, a decoding process, a downsampling process, an upscaling process, a frame stitching process, a projection process, an extraction process, and an indexing process.

In some embodiments, the N sub-processing tasks can be performed on the N sub-streams in parallel.

In order to perform the merge operation, the N processed sub-streams can be received by a merge buffer that is configured to merge the N processed sub-streams into the merged output data stream. The merge buffer can include an output iFIFO buffer and N sub-output iFIFO buffers that are coupled to the output iFIFO buffer. The N sub-output iFIFO buffers can be configured to receive the processed sub-streams. The output iFIFO buffer can be configured to (i) receive the processed sub-streams from the N sub-output iFIFO buffers, (ii) merge the processed sub-streams based on the index information of the segments of the processed sub-streams, and (iii) output the merged output data stream.

In some examples, the apparatus for parallel processing of the data stream includes receiving circuitry and processing circuitry that is configured to perform one or more of the methods described above.

Aspects of the disclosure also provide a non-transitory computer-readable medium storing instructions which when executed by a computer for parallel processing of a data stream cause the computer to perform one or more of the methods described above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Aspects of the disclosure are related to a mechanism for parallel processing of tasks or workflows in cloud platforms and therefore increasing the processing speed of the processing.

In general, a workflow can include processing tasks or tasks (e.g., media processing tasks). A connected graph can represent the workflow by using connections to represent input/output relationships among the processing tasks. Thus, the workflow can be considered as a connected graph of processing tasks. Each task can perform an operation (e.g., a media processing operation), such as video decoding, video stitching, video encoding, and/or the like. A workflow manager can ensure correct operation of the workflow by configuring and monitoring each task and a workflow output. The workflow manager can be configured to select processing functions (e.g., media processing functions) and instantiating the processing functions (e.g., the media processing functions) as respective tasks based on a workflow description that, for example, is received from the data processing source (e.g., the NBMP source).

Processing entities (e.g., media processing entities) that are configured to run the processing tasks can be established, loaded, instantiated, and monitored. Interfaces such as application programming interfaces (APIs) can be defined between the data processing source and the workflow manager, the workflow manager and the processing task(s), and an API to discover appropriate function(s). In general, a data processing system or platform (e.g., a NBMP platform) can be data format (e.g., media format) and protocol agnostic. The data processing system can identify and signal the data (e.g., the media data), metadata and auxiliary information formats for data exchanged between a data source (e.g., a media source), the workflow manager, and tasks.

A data processing framework (e.g., a NBMP framework) can define interfaces including both data formats and APIs among various entities connected through digital networks for data processing. Users can access and configure user operations remotely for efficient and intelligent processing. The data can be uploaded, for example, to the network, the processing tasks can be instantiated, and the processing tasks can be further configured. The data processing framework can enable dynamic creation of data processing pipelines (e.g., media processing pipelines), as well as access to processed data and metadata in real-time or in a deferred way. The data and metadata formats used between the data source, the workflow manager, and the data processing entities in a data processing pipeline can be specified.

The data processing framework can enable clients (e.g., creators, service providers, and consumers of digital media) to describe data processing operations to be performed by the data processing entities, for example, in the network. A workflow can be described by composing a set of data processing functions that are accessible through interfaces (e.g., NBMP APIs). A data processing entity (e.g., a media processing entity (MPE)) can run processing tasks applied on the data and the related metadata received from data source(s) or other tasks. The data processing entity (e.g., MPE) can provide capabilities for configuring, managing, and monitoring processing tasks. A data processing task can be a process applied to data and metadata input(s), producing data and related metadata output(s) to be consumed by a data sink (e.g., a media sink) or other data processing tasks (e.g., media processing tasks).

The data processing framework can support various delivery methods such as streaming, file delivery, push-based progressive download, hybrid delivery, multipath, and heterogeneous network environments.

Figure 1:
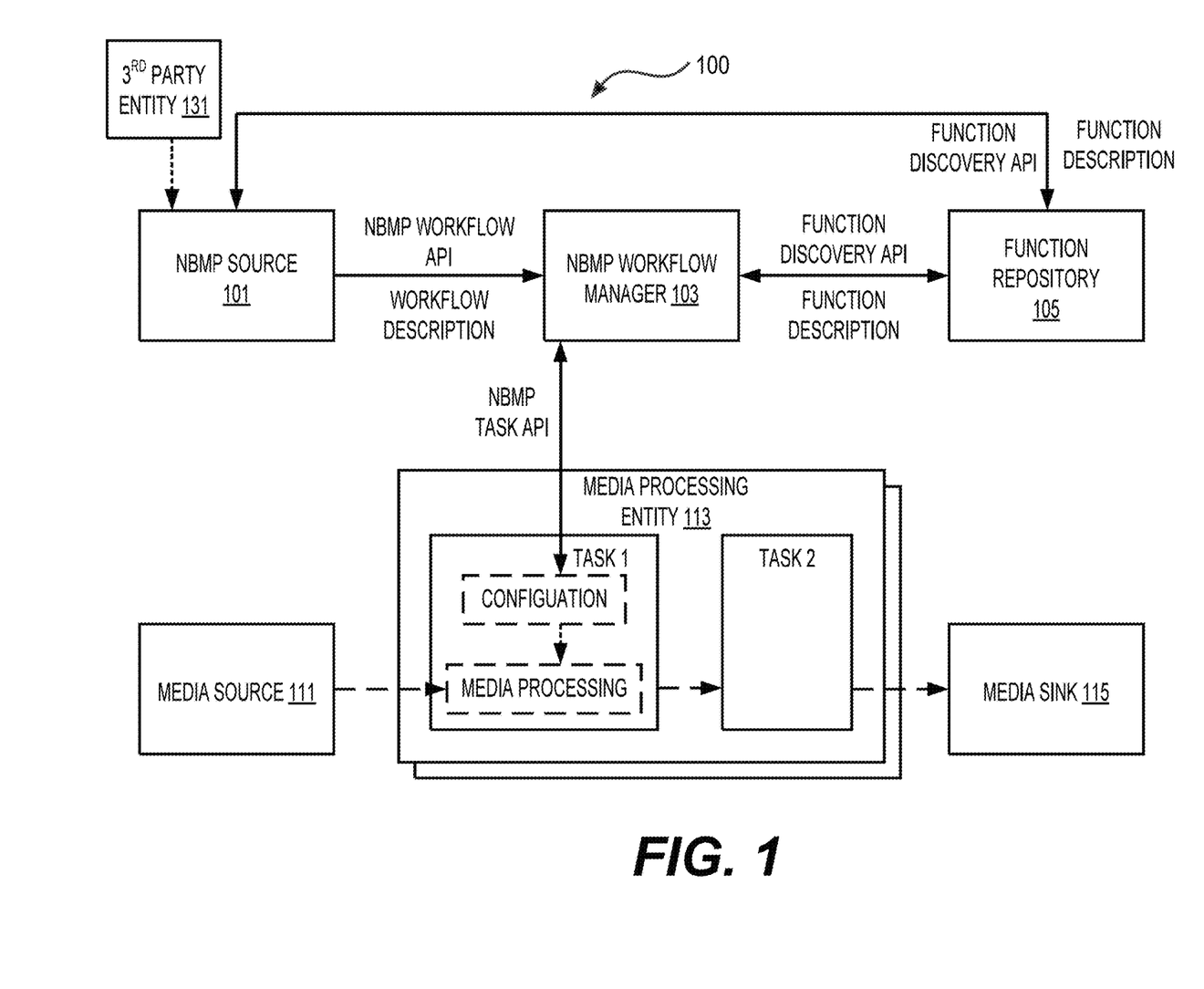
FIG. 1 shows an exemplary data processing system according to an embodiment of the disclosure.

FIG. 1 shows an exemplary data processing system (e.g., NBMP system, a NBMP reference architecture, a NBMP architecture) (100) according to an embodiment of the disclosure. The data processing system (100) can include a plurality of entities, such as a data source (e.g., a NBMP source, a NBMP source entity) (101), a workflow manager (e.g., a NBMP workflow manager) (103), a function repository (105), a data source or a data source entity (e.g., a media source, a media source entity) (111), a data processing entity (e.g., a MPE) (113), a data sink or a data sink entity (e.g., a media sink or a media sink entity) (115), a third party entity, and/or the like. The data processing system (100) can include additional data source(s), data sink(s), and/or data processing entities. The data processing system (100) can process data across one or more processing entities in a network. Information, such as various data and control information (or control data) for the data, can be communicated among the plurality of entities in the data processing system (100).

To provide a context for discussion purposes, the data processing system (100) is described as the NBMP system (100) below. The descriptions can be suitably adapted to any data processing system.

The NBMP source (101) can describe, or otherwise indicate, media processing in the network. The function repository (105) can include NBMP function descriptions of various NBMP functions. The NBMP source (101) and the workflow manager (103) can retrieve the NBMP function descriptions or functions from the function repository (105). An NBMP function can refer to implementation of a stand-alone and self-contained media processing operation and/or the corresponding description of the operation.

A processing task or a task can refer to a runtime instance of a NBMP function that is executed by the MPE (113). An NBMP workflow or a workflow can be represented by a graph (e.g., a directed acyclic graph (DAG)) of one or more connected task(s) that achieves the requested media processing. The workflow manager (103) can provision task(s) and connect the task(s) to create, control, manage and monitor a workflow, for example, based on a workflow description document (WDD).

The media source (111) can provide media content (e.g., media data, supplementary information) to be processed by a workflow. The supplementary information can include metadata or auxiliary information related to the media data. The media source (111) can provide an input to the workflow. The media sink (115) can consume an output of the workflow. The MPE (113) can run one or more media processing task(s) to process the media content.

Different entities (e.g., the NBMP Source (101), the workflow manager (103) and the MPE (113)) in the NBMP system (100) can use APIs to invoke and respond to media service requests. The APIs can include a NBMP workflow API or a workflow API, a function discovery API, and a task API. The workflow API can provide an interface between the NBMP Source (101) and the workflow manager (103). The task API can provide an interface between the workflow manager (103) and media processing tasks. The function discovery API can provide an interface between the workflow manager (103)/the NBMP Source (101) and the Function Repository (105).

NBMP interfaces described above can be used to create and control media processing workflows in the network. The NBMP system (100) can be split into a control plane and a media plane (or media data plane). The control plane can include the workflow API, the function discovery API, and the task API.

The workflow API can be used by the NBMP source (101) to create and control a media processing workflow. The NBMP Source (101) can use the workflow API to communicate with the workflow manager (103) for configuring and controlling media processing in the network. When the NBMP Source (101) sends a request to the workflow manager (103) by including a workflow resource (WR) in an operation of the workflow API, the workflow manager (103) can parse the WR, the included WDD and corresponding descriptors, and take the appropriate actions according to the requested operation. Then, the workflow manager (103) can acknowledge the request with a response. The workflow API operations can include creating a workflow (e.g., CreateWorkflow), updating a workflow (e.g., UpdateWorkflow), deleting a workflow (e.g., DeleteWorkflow), retrieving a workflow (e.g., RetrieveWorkflow), and the like.

The function discovery API can provide the means for the workflow manager (103) and/or the NBMP Source (101) to discover media processing functions that can be loaded as part of a media processing workflow.

The task API can be used by the workflow manager (103) to configure and monitor task(s) (e.g., a task 1 and a task 2 run by the MPE (113)) at runtime. The task API can define interface(s) for configuration of media processing tasks by the workflow manager (103), for example, after the resources for the task are allocated in the MPE (113). Task API operations can include creating a task (e.g., CreateTask), updating a task (e.g., UpdateTask), getting a task (e.g., GetTask), deleting a task (e.g., DeleteTask), and the like.

On the media plane, the media formats, the metadata, and the supplementary information formats between the NBMP Source (111) and task(s), as well as between the tasks can be defined.

A workflow description (WD) can be passed from the NBMP source (101) to the workflow manager (103). The WD can describe information such as input data and output data, functions and other requirements for the workflow.

The workflow manager (103) can receive a WDD from the NBMP source (101) and can build a workflow for requested media processing. In a workflow procedure, media processing functions can be selected, for example, from the function repository (105), and then corresponding media processing tasks can be configured and distributed to a set of one or more MPEs (e.g., including the MPE (113)).

The set of functions provided by the function repository (105) can be read by an NBMP source (101) and the workflow manager (103). In an embodiment, the NBMP source (101) requests the creation of a workflow using a set of functions in the function repository (105). Accordingly, the NBMP source (101) is configured to select functions for the workflow. The NBMP source (101) can request the creation of the workflow as described below. The NBMP source (101) can use a description of the media processing tasks by which the workflow is to be created, and can specify a connection map to define connections of inputs and outputs of the media processing tasks. When the workflow manager (103) receives the above information from the NBMP source (101), the workflow manager (103) can instantiate the media processing tasks based on respective function names and can connect the media processing tasks according to the connection map.

Alternatively, the NBMP source (101) can request the creation of a workflow using a set of keywords by which the workflow manager (103) can construct the workflow. Accordingly, the NBMP source (101) may not be aware of a set of functions to be inserted into the workflow. The NBMP source (101) can request the creation of the workflow as described below. The NBMP source (101) can use the set of keywords by which the workflow manager (103) can find the appropriate functions, and can specify the requirements of the workflow using suitable workflow description.

When the workflow manager (103) receives the above information (e.g., the set of keywords) from the NBMP source (101), the workflow manager (103) can create the workflow by searching for appropriate functions using the keywords, for example, specified in a processing descriptor. The workflow manager (103) can then use other descriptors in the workflow description to provision the media processing tasks and connect the media processing tasks to create the final workflow.

A processing model of the workflow manager (103) can be described as below.

The workflow manager (103) can discover available media processing functions as below. The NBMP function repository (105) can provide the function discovery interface (or API) to allow external entities to query for a media processing function that can fulfil the requested processing. The workflow manager (103) can have access to a directory service that offers a searchable list of media processing functions. The workflow manager (103) can use the description of the media processing tasks in the workflow description to find the appropriate functions for the workflow.

Selection of the media processing tasks for the workflow can be described below. When a request for media processing is received from the NBMP source (101), the workflow manager (103) can search the function repository (105) to find the list of all available functions that can fulfill the workflow. Using the workflow description from the NBMP Source (101), the workflow manager (103) can find the functions from the function repository (105) to implement the workflow, which can depend on the information for media processing from the NBMP Source (101). The information for media processing can include the input and output description, the description of the requested processing, and the information in other descriptors for functions in the function directory (105). Mapping of the source requests to appropriate media processing tasks to be included in the workflow can be a part of the implementation of the NBMP in the network. To reference and link input sources with input port names and output port names at the time of task creation, the input-ports and output-ports can be used to make references to the input streams.

A search for appropriate functions to be instantiated as tasks can be performed by the workflow manager (103) using a function discovery API. Alternatively, the workflow manager (103) can retrieve detailed information of some or all suitable functions in the function repository (105) using the function discovery API. The workflow manager (103) can then compare the information for media processing from the NBMP source (101) with different descriptors of each function.

Selected media processing tasks can be configured in the workflow. When the functions to be included in the workflow are identified, the NBMP workflow manager (103) can instantiate the functions as respective tasks and configure the tasks so that the tasks can be added to the workflow. The NBMP workflow manager (103) can extract the configuration data from the media processing information received from the NBMP source (101) and configure the corresponding tasks. The configuration of the Tasks can be performed using a task API (e.g., NBMP task API).

Examples of task allocation and distribution are described below. The workflow manager (103) can use the workflow to perform processing deployment and configure the media processing entities. In an example, for computationally intensive media processing requests, the workflow manager (103) can set up multiple computational instances and distribute a workload among the multiple computational instances. Thus, the workflow manager (103) can connect and configure the multiple computational instances as needed. In an example, the workflow manager (103) allocates a same task to multiple instances and provisions a load balancer to distribute the workload among the multiple instances using a chosen scheduling mechanism. In an alternative example, the workflow manager (103) allocates different operations of the same task to different instances (e.g., parallel operations). In both examples described above, the workflow manager (103) can set up the workflow paths between the instances, and thus the suitable workload can be successfully realized. The workflow manager (103) can configure the tasks to push the processed media data/ streams (or make them available through a pull mechanism) to a next task in the workflow graph.

When the workflow manager (103) receives a WDD from the NBMP Source (101), the workflow manager (103) can perform a selection of media processing functions to be inserted into the workflow. When the list of tasks to be included in the workflow is compiled, the workflow manager (103) can then connect the tasks to prepare the workflow.

Figure 2:
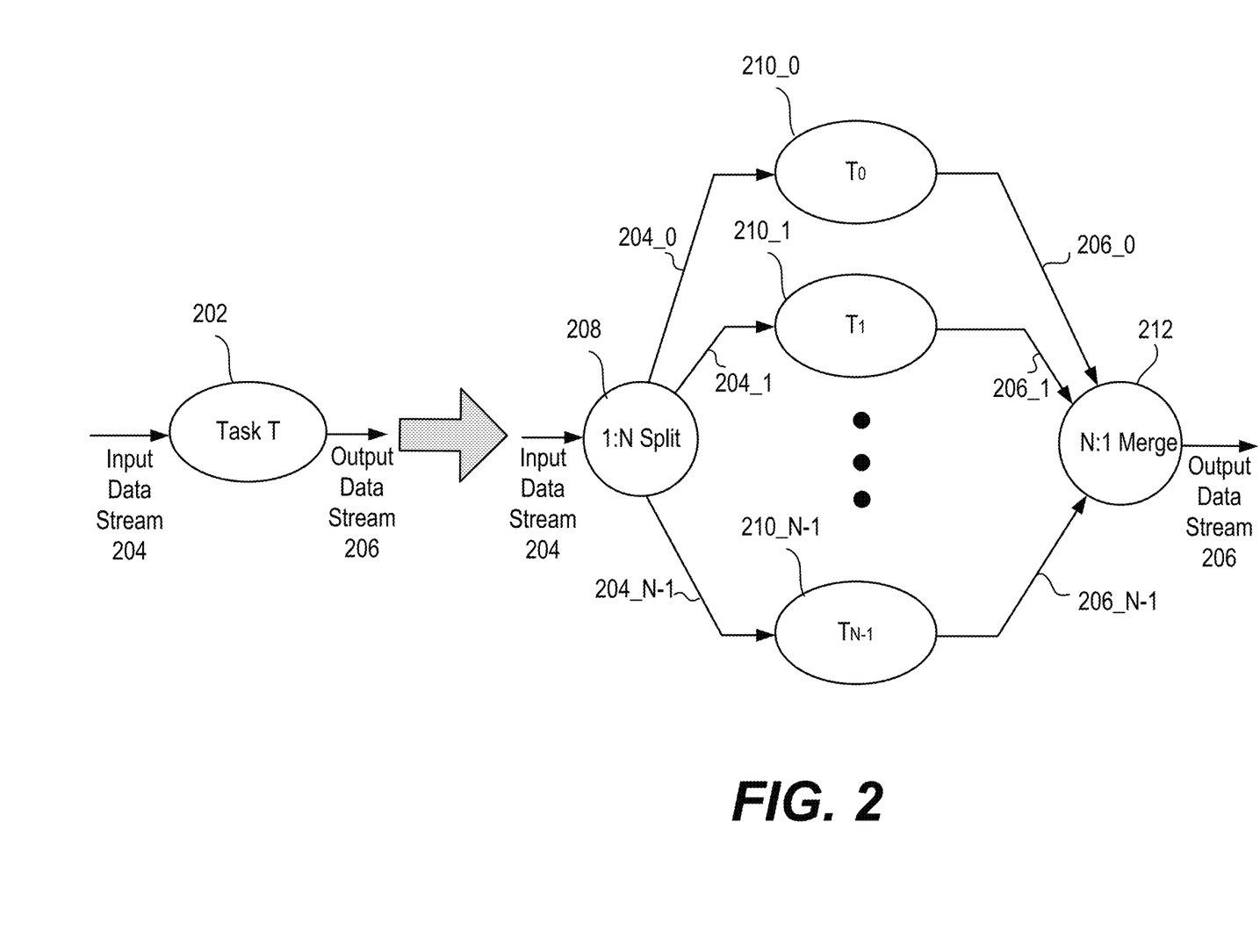
FIG. 2 is a schematic diagram of converting a task to multi-instance parallel tasks according to an embodiment of the disclosure.

FIG. 2 shows an exemplary embodiment of a parallel segment processing mode. As shown in FIG. 2, in a related example, a data stream (or input data stream) (204) can be transmitted to receive a task T (or processing task T) (202), where the data stream (204) can include a plurality of segments. For example, the task T (202) can be one of an encoding process, a decoding process, a downsampling process, an upscaling process, a frame stitching process, a projection process, an extraction process, and an indexing process in the case of media processing. When the data stream (204) is processed by the task T (202), an output data stream (or processed data stream) (206) can be generated. In the disclosure, the data stream (204) can be provided to a 1:N split task (or split operation, or split function) (208), where the data stream (204) can be split into N sub-streams (204_0) to (204_N-1) by the 1:N split task. Each of the N sub-streams (204_0) to (204_N-1) can include one or more segments of the data stream (204). In some embodiments, the data stream (204) can be split unequally by the 1:N split task. In other embodiments, the data stream (204) can be split equally by the 1:N split task.

The N sub-streams (204_0) to (204_N-1) can be further provided to N sub-processing tasks $T_0$-$T_{N-1}$ (or N instances $T_0$-$T_{N-1}$ of the task T). As shown in FIG. 2, each of the sub-streams (204_0) to (204_N-1) can be processed by a respective sub-processing task (or respective instance of the task T). In some embodiments, each of the N sub-processing tasks $T_0$-$T_{N-1}$ can perform a same process as the processing task T (202). For example, when the processing task T (202) is an encoding process, the N sub-processing tasks $T_0$-$T_{N-1}$ can also be encoding processes. Thus, each of the sub-streams (204_0) to (204_N-1) can be processed by a respective encoding process. In addition, the N sub-processing tasks $T_0$-$T_{N-1}$ can be operated in parallel or independently, which means that the N sub-streams (204_0) to (204_N-1) do not need to be processed at a same time.

The N sub-streams (204_0) to (204_N-1) can be processed by the N sub-processing tasks $T_0$-$T_{N-1}$ to generate N processed sub-streams (206_0) to (206_N-1), where each of the N processed sub-streams (206_0) to (206_N-1) is generated by a respective sub-processing task. For example, the sub-stream (206_0) can be generated by the sub-processing task $T_0$ by processing the sub-stream (204_0). The N processed sub-streams (206_0) to (206_N-1) can further be provided to a N:1 merge operation (or merge task) (206), where the N:1 merge operation can merge the N processed sub-streams (206_0) to (206_N-1) to generate an output stream (206). It should be noted that the output data stream 206 is identical to the output data steam (206) that is generated when the processing task T (or task T) (202) is applied directly to the data stream (204) without the 1:N split operation (208).

In some embodiments, the media stream (or data stream, or input data stream) 204 is continuous. Thus, the 1:N split task (or 1:N split operation) (208) is configured to split the media stream (204) to N media sub-streams (or N sub-streams) (204_0) to (204_N-1). Each of the sub-streams (204_0) to (204_N-1) is processed by an instance of task T (or a sub-processing task) to generate a corresponding sub-stream. The processed sub-streams (e.g., (206_0) to (206_N-1)) can further be interleaved together (or merged together) to generate the output media stream (or data stream) (206), which is equivalent to an output media stream generated by the task T (202).

In the disclosure, the 1:N split function (or operation, or task) and the N:1 merge function (or operation, or task) can work on boundaries of the segments of the data stream (or media stream). Each of the segments can have a duration equal to one or a multiple of Task Segment Duration (TSD) of the task T (202), where the TSD of the task T (202) can be a number of frames (e.g., five frames) and a number of seconds (e.g., 5 seconds). Accordingly, the segments and consequently the sub-streams can be independent of each other in terms of being processed by the sub-processing task (or instances of the task T) $T_0$, . . . , $T_{N-1}$. Note that the instances of task T (e.g., $T_0$, . . . , $T_{N-1}$) do not need to process the segments at the same time. Since the segments and sub-streams are independent, each of the instances of the task T can run at a respective speed.

In addition, since each of the segments in a corresponding sub-stream carries a respective start time, a respective duration and a respective length, the segments can be multiplexed together in a correct order. For example, the segments can be multiplexed according to the start times of the segments.

Figure 3:
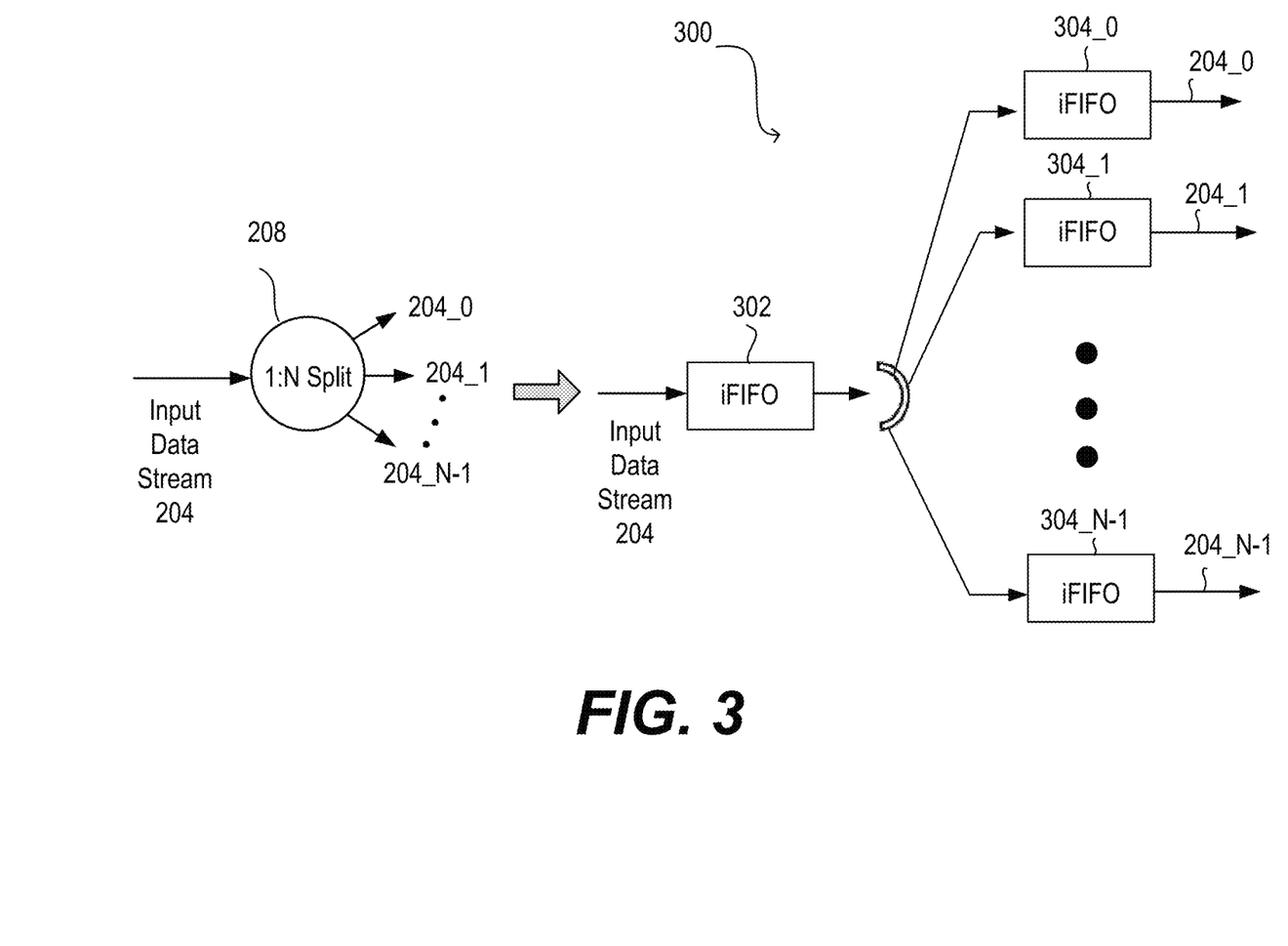
FIG. 3 is a schematic diagram of a 1:N split function according to an embodiment of the disclosure.
Figure 4:
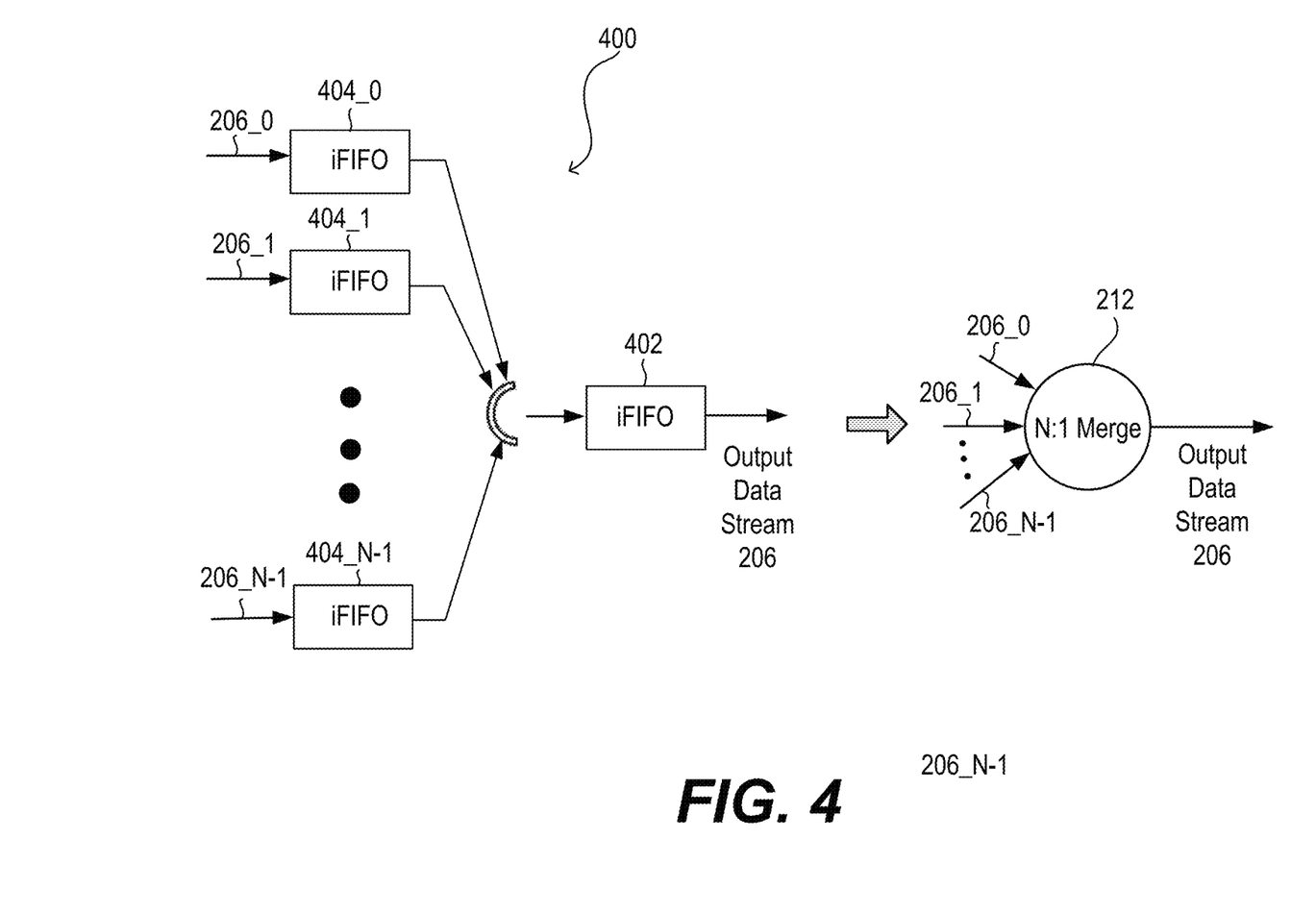
FIG. 4 is a schematic diagram of a N:1 merge function according to an embodiment of the disclosure.

The 1:N split function and the N:1 merge function, can be implemented by using iFIFO buffers that are shown in FIGS. 3 and 4 respectively. As shown in FIG. 3, the 1:N split function (208) can be implemented through a split buffer (300) that is configured to split the data stream (204) into the N sub-streams (204_0) to (204_N-1). The split buffer (300) can include an input iFIFO buffer (302) and N sub-input iFIFO buffers (304_0) to (304_N-1) that are coupled to the input iFIFO buffer (302). The input iFIFO buffer (302) is configured to receive the data stream (e.g., (204)) and index information of the segments of the data stream, and distribute the segments of the data stream to the N sub-input iFIFO buffers (304_0) to (304_N-1). The indexed information can include a respective start time, a respective duration, and a respective length for each of the segments. Each of the N sub-input iFIFO buffers (304_0) to (304_N−1) can receive one or more segments from the input iFIFO buffer (302) and output a corresponding sub-stream (e.g., (204_0) to (204_N−1)) that includes the one or more segments. Further, each of the sub-streams can be transmitted to receive a corresponding sub-processing task (e.g., $T_0$ to $T_{N-1}$).

FIG. 4 shows that the N:1 merge function (212) can be implemented through a merge buffer (400) that is configured to merge the N processed sub-streams into the output data stream. As shown in FIG. 4, the merge buffer (400) can include an output iFIFO buffer (402) and N sub-output iFIFO buffers (404_0) to (404_N−1) that are coupled to the output iFIFO buffer (402). As shown in FIG. 4, the N sub-output iFIFO buffers (404_0) to (404_N−1) are configured to receive the processed sub-streams (e.g., (206_0) to (206_N−1)), where each of the sub-output iFIFO buffers can receive a corresponding process sub-stream. For example, the sub-output iFIFO buffer (404_0) can receive the processed sub-stream (206_0). The output iFIFO buffer (402) is configured to (i) receive the processed sub-streams (e.g., (206_0) to (206_N−1)) from the N sub-output iFIFO buffers (404_0) to (404_N−1), (ii) merge the processed sub-streams based on the index information of the segments of the processed sub-streams, and (iii) generate the output data stream (206).

In the disclosure, switches between the split task and the merge task do not need to interleave the data stream uniformly. As long as the iFIFOs are not overflown, any split operation or merge operation can be performed on the data stream since each of the segments of the data stream have a respective timing, and the segments can be put back (or merge together) in correct places (e.g., a correct order) according to the timings of the segments after processing.

Figure 5:
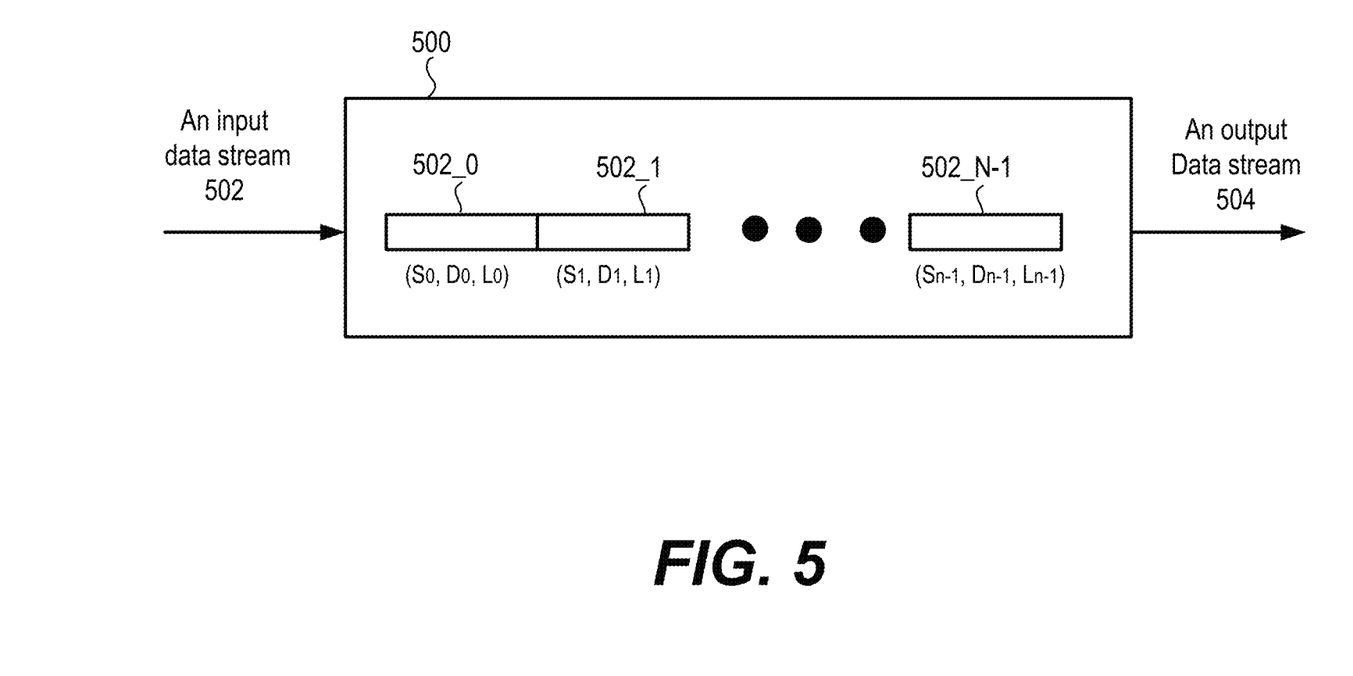
FIG. 5 shows a schematic diagram of an indexed first in and first out (iFIFO) function according to an embodiment of the disclosure.

FIG. 5 is schematic diagram of an iFIFO function by an iFIFO buffer that is configured to store segments of an input data stream in an order according to the indexed information of the segments of the data stream. As shown in FIG. 5, an input data stream (502) can be transmitted to an iFIFO buffer (500) that can have a same function as the iFIFO buffers as mentioned above, such as the input iFIFO buffer (302) or the output iFIFO buffer (402). The input data stream (502) can include segments (502_0) to (502_N−1), where each of the segments (502_0) to (502_N−1) of the input data stream (502) can have respective indexed information that includes a start time s (msec), a duration d (msec), and a respective length 1 (bytes). The segments (502_0) to (502_N−1) thus are stored in the iFIFO buffer (500) in an order according to the indexed information of the segments (502_0) to (502_N−1), such as according to the start time. In the iFIFO buffer (500), a first input entry is a first output entry. Thus, the segments (502_0) to (502_N−1) are output to form an output data stream (504) according to the order in which the segments (502_0) to (502_N−1) are stored the iFIFO buffer (500). For example, the segment (502_0) can have a first start time, and then be stored in the iFIFO buffer 500 first. The segment (502_0) accordingly can be output first in the output data stream (504).

Recently, containerized application on cloud has become popular and enables easy scaling of a task/function. However, cloud containers often do not have a state. Therefore, if multiple instances of a task are run as containers, the multiple instances of the task cannot rely on their own or others' states and internal data.

In the disclosure, the 1:N split function and the N:1 merge function that are performed based on segments allow to use of containerized media tasks and workflows because each of the segments can be processed independently and the states of the containers are not required to be maintained.

Figure 6:
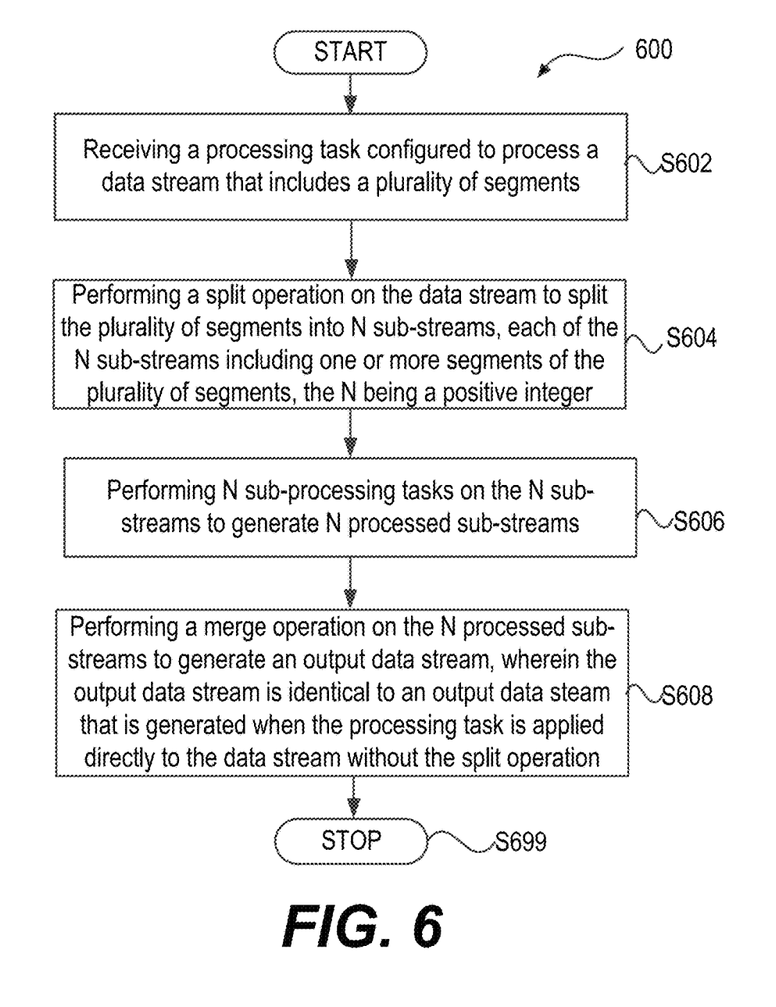
FIG. 6 shows a flow chart outlining a process for parallel processing of a data stream according to an embodiment of the disclosure.

FIG. 6 shows a flow chart outlining a process (600) according to an embodiment of the disclosure. In an example, the process (600) is implemented using the data processing system (e.g., the NBMP system) (100) to process input data, such as media data stream or data stream. In some embodiments, the process (600) is implemented in software instructions, thus when the processing circuitry executes the software instructions, the processing circuitry performs the process (600). The process starts at (S602), where a processing task can be received. The processing task is configured to process a data stream that includes a plurality of segments.

The process (600) then proceeds to (S604). At (S604), a split operation can be performed on the data stream to split the plurality of segments into N sub-streams, where each of the N sub-streams can include one or more segments of the plurality of segments, and the N can be a positive integer. In some embodiments, in order to perform the split operation, the data stream can be transmitted to a split buffer that is configured to split the data stream into the N sub-streams. The split buffer can include an input iFIFO buffer and N sub-input iFIFO buffers that are coupled to the input iFIFO buffer. The input iFIFO buffer is configured to receive the data stream and index information of the segments of the data stream, and distribute the segments of the data stream to the N sub-input iFIFO buffers. Each of the N sub-input iFIFO buffers can receive the respective one or more segments from the input iFIFO buffer and outputs a corresponding sub-stream that includes the respective one or more segments to a different one of the N sub-processing tasks. In some embodiments, the data stream is split according to boundaries of the segments.

At (S606), N sub-processing tasks can be performed on the N sub-streams to generate N processed sub-streams. In some embodiments, each of the N sub-processing tasks can perform a same process as the processing task. In some embodiments, the N sub-processing tasks can be performed on the N sub-streams in parallel.

The process (600) then proceeds to (S608), where a merge operation can be performed on the N processed sub-streams to generate an output data stream. The output data stream can be identical to an output data steam that is generated when the processing task is applied directly to the data stream without the split operation. In some embodiments, in order to perform the merge operation, the N processed sub-streams can be received by a merge buffer that is configured to merge the N processed sub-streams into the output data stream. The merge buffer can include an output iFIFO buffer and N sub-output iFIFO buffers that are coupled to the output iFIFO buffer. The N sub-output iFIFO buffers can be configured to receive the processed sub-streams. The output iFIFO buffer can be configured to (i) receive the processed sub-streams from the N sub-output iFIFO buffers, (ii) merge the processed sub-streams based on the index information of the segments of the processed sub-streams, and (iii) output the output data stream.

The techniques described above, can be implemented as computer software using computer-readable instructions and physically stored in one or more computer-readable media.

The methods and embodiments in the disclosure may be used separately or combined in any order. Further, each of the methods (or embodiments), functions or tasks, may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 7 shows an exemplary computer system (700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
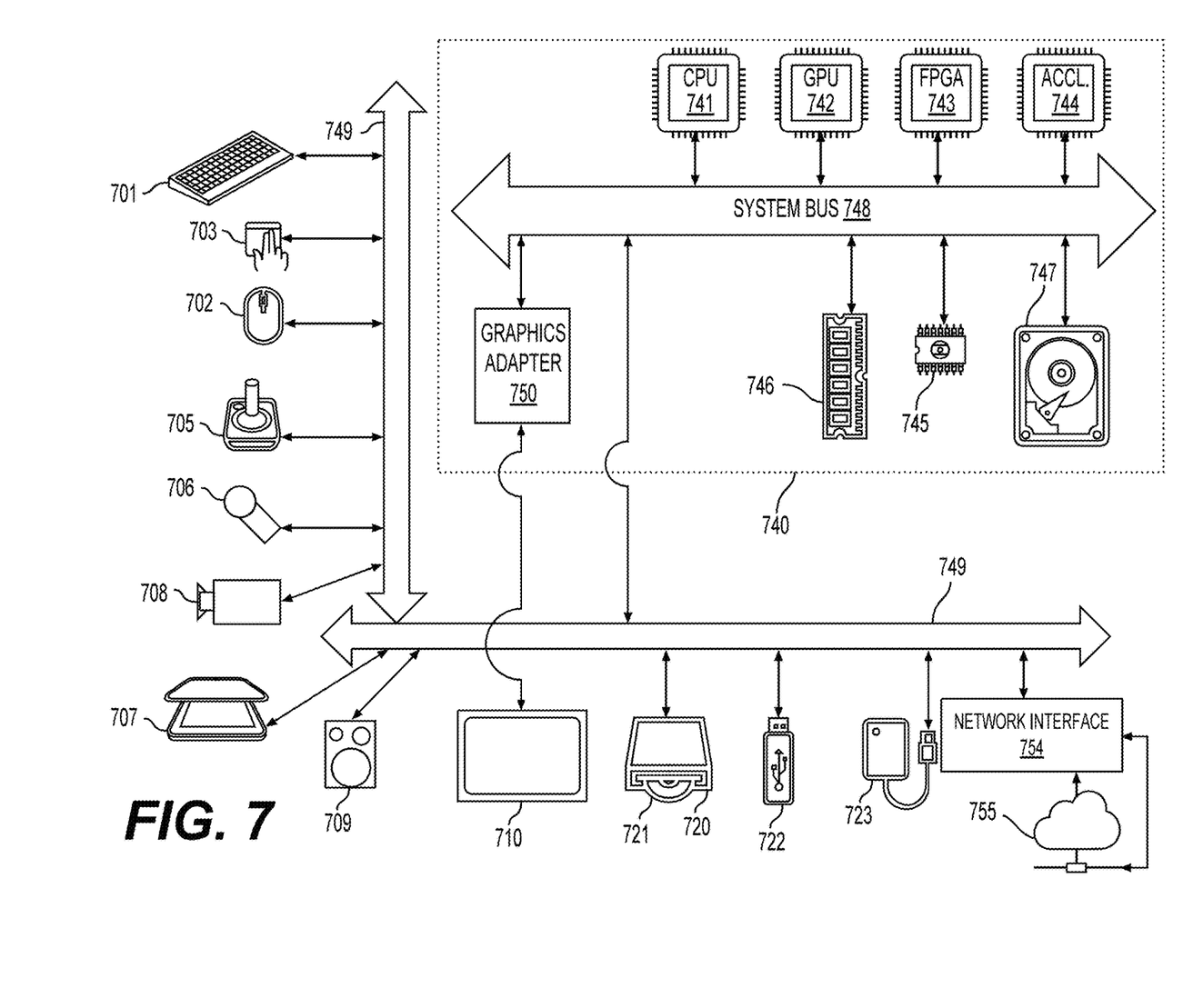
FIG. 7 shows a schematic illustration of a computer system in accordance with an embodiment.

The components shown in FIG. 7 for computer system (700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), and camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (700) can also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), and so forth. These devices, along with Read-only memory (ROM) (745), Random-access memory (746), internal mass storage such as internal non-user accessible hard drives, SSDs, and the like (747), may be connected through a system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can be also be stored in RAM (746), whereas permanent data can be stored for example, in the internal mass storage (747). Fast storage and retrieve to any of the memory devices can be enabled through the use of cache memory, that can be closely associated with one or more CPU (741), GPU (742), mass storage (747), ROM (745), RAM (746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (700), and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various embodiments of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for parallel processing of a data stream, comprising:
   receiving a processing task that is configured to process the data stream that includes a plurality of segments;
   performing a split operation on the data stream based on a split buffer to split the plurality of segments into N sub-streams, each of the N sub-streams including one or more segments of the plurality of segments, the N being a positive integer, the split buffer including an input indexed first in first out (iFIFO) buffer and N sub-input iFIFO buffers coupled to the input iFIFO buffer, the input iFIFO buffer being configured to receive the plurality of segments of the data stream and distribute the plurality of segments to the N sub-input iFIFO buffers to generate the N sub-streams;
   performing N sub-processing tasks on the N sub-streams to generate N processed sub-streams; and
   performing a merge operation on the N processed sub-streams to generate a merged output data stream, wherein the merged output data stream is identical to an output data stream that is generated when the processing task is applied directly to the data stream without the split operation.

2. The method of claim 1, wherein each of the N sub-processing tasks performs a same process as the processing task.

3. The method of claim 1, wherein
   the input iFIFO buffer is further configured to receive index information of the plurality of segments of the data stream, and distribute the index information of the plurality of segments of the data stream to the N sub-input iFIFO buffers, and
   each of the N sub-input iFIFO buffers receives the one or more segments from the input iFIFO buffer and outputs a corresponding sub-stream that includes the one or more segments to a different one of the N sub-processing tasks.

4. The method of claim 3, wherein the performing the split operation comprises:
   splitting the data stream according to boundaries of the plurality of segments.

5. The method of claim 4, wherein the index information of each of the plurality of segments of the data stream includes a respective start time, a respective duration, and a respective length.

6. The method of claim 5, wherein the respective duration of each of the plurality of segments of the data stream is equal to one or a multiple of a process segment duration of the processing task.

7. The method of claim 6, wherein the process segment duration of the processing task is one of a number of frames and a number of seconds.

8. The method of claim 1, wherein the processing task includes at least one of an encoding process, a decoding process, a downsampling process, an upscaling process, a frame stitching process, a projection process, an extraction process, and an indexing process.

9. The method of claim 3, wherein the performing the N sub-processing tasks on the N sub-streams further comprises:
   performing the N sub-processing tasks on the N sub-streams in parallel.

10. The method of claim 9, wherein the performing the merge operation further comprises:
    receiving the N processed sub-streams by a merge buffer that is configured to merge the N processed sub-streams into the merged output data stream, wherein:
    the merge buffer includes an output iFIFO buffer and N sub-output iFIFO buffers that are coupled to the output iFIFO buffer;
    the N sub-output iFIFO buffers are configured to receive the N processed sub-streams; and
    the output iFIFO buffer is configured to (i) receive the N processed sub-streams from the N sub-output iFIFO buffers, (ii) merge the N processed sub-streams based on the index information of the segments of the N processed sub-streams, and (iii) output the merged output data stream.

11. An apparatus for parallel processing of a data stream, comprising:
    processing circuitry configured to:
    receive a processing task that is configured to process the data stream that includes a plurality of segments;
    perform a split operation on the data stream based on a split buffer to split the plurality of segments into N sub-streams, each of the N sub-streams including one or more segments of the plurality of segments, the N being a positive integer, the split buffer including an input indexed first in first out (iFIFO) buffer and N sub-input iFIFO buffers coupled to the input iFIFO buffer, the input iFIFO buffer being configured to receive the plurality of segments of the data stream and distribute the plurality of segments to the N sub-input iFIFO buffers to generate the N sub-streams;

perform N sub-processing tasks on the N sub-streams to generate N processed sub-streams; and perform a merge operation on the N processed sub-streams to generate a merged output data stream, wherein the merged output data stream is identical to an output data steam that is generated when the processing task is applied directly to the data stream without the split operation.

12. The apparatus of claim 11, wherein each of the N sub-processing tasks performs a same process as the processing task.

13. The apparatus of claim 11, wherein the input iFIFO buffer is further configured to receive index information of the plurality of segments of the data stream, and distribute the index information of the plurality of segments of the data stream to the N sub-input iFIFO buffers, and each of the N sub-input iFIFO buffers receives the one or more segments from the input iFIFO buffer and outputs a corresponding sub-stream that includes the one or more segments to a different one of the N sub-processing tasks.

14. The apparatus of claim 13, wherein the processing circuitry is further configured to:

split the data stream according to boundaries of the plurality of segments.

15. The apparatus of claim 14, wherein the index information of each of the plurality of segments of the data stream includes a respective start time, a respective duration, and a respective length.

16. The apparatus of claim 15, wherein the respective duration of each of the plurality of segments of the data stream is equal to one or a multiple of a process segment duration of the processing task, and the process segment duration of the processing task is one of a number of frames and a number of seconds.

17. The apparatus of claim 11, wherein the processing task includes at least one of an encoding process, a decoding process, a downsampling process, an upscaling process, a frame stitching process, a projection process, an extraction process, and an indexing process.

18. The apparatus of claim 13, wherein the processing circuitry is configured to:

perform the N sub-processing tasks on the N sub-streams in parallel.

19. The apparatus of claim 18, wherein the processing circuitry is further configured to:

receive the N processed sub-streams by a merge buffer that is configured to merge the N processed sub-streams into the merged output data stream, wherein:

the merge buffer includes an output iFIFO buffer and N sub-output iFIFO buffers that are coupled to the output iFIFO buffer;

the N sub-output iFIFO buffers are configured to receive the N processed sub-streams; and the output iFIFO buffer is configured to (i) receive the N processed sub-streams from the N sub-output iFIFO buffers, (ii) merge the N processed sub-streams based on the index information of the segments of the N processed sub-streams, and (iii) output the merged output data stream.

20. A non-transitory computer-readable medium storing instructions which when executed by a computer for parallel processing of a data stream cause the computer to perform:

receiving a processing task that is configured to process the data stream that includes a plurality of segments;

performing a split operation on the data stream based on a split buffer to split the plurality of segments into N sub-streams, each of the N sub-streams including one or more segments of the plurality of segments, the N being a positive integer, the split buffer including an input indexed first in first out (iFIFO) buffer and N sub-input iFIFO buffers coupled to the input iFIFO buffer, the input iFIFO buffer being configured to receive the plurality of segments of the data stream and distribute the plurality of segments to the N sub-input iFIFO buffers to generate the N sub-streams;

performing N sub-processing tasks on the N sub-streams to generate N processed sub-streams; and performing a merge operation on the N processed sub-streams to generate a merged output data stream, wherein the merged output data stream is identical to an output data stream that is generated when the processing task is applied directly to the data stream without the split operation.

* * * * *